(12) United States Patent
Cannon et al.

(10) Patent No.: US 7,177,668 B2
(45) Date of Patent: Feb. 13, 2007

(54) ACCESS MONITORING VIA PICONET CONNECTION TO TELEPHONE

(75) Inventors: Joseph M. Cannon, Harleysville, PA (US); James J. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 148 days.

(21) Appl. No.: 10/827,415

(22) Filed: Apr. 20, 2004

(65) Prior Publication Data

US 2004/0198448 A1  Oct. 7, 2004

Related U.S. Application Data

(63) Continuation of application No. 09/553,283, filed on Apr. 20, 2000, now abandoned.

(51) Int. Cl.
*H04M 1/00* (2006.01)

(52) U.S. Cl. .................... 455/561; 455/41.1; 379/67.1

(58) Field of Classification Search .......... 340/539.15, 340/573.4, 10.3; 600/300; 379/102.02, 379/67.1, 68–74, 85, 87, 88.22, 88.23, 88.24; 455/550.1, 41.1, 561; 381/315
See application file for complete search history.

(56) References Cited

U.S. PATENT DOCUMENTS

| | | | |
|---|---|---|---|
| 5,553,124 A | | 9/1996 | Brinskele |
| 5,629,981 A | | 5/1997 | Nerlikar |
| 5,717,867 A | | 2/1998 | Wynn et al. |
| 5,892,817 A | * | 4/1999 | Will .................. 379/102.02 |
| 5,966,671 A | * | 10/1999 | Mitchell et al. .......... 455/550.1 |
| 6,026,297 A | | 2/2000 | Haartsen |
| 6,236,319 B1 | * | 5/2001 | Pitzer et al. ............. 340/573.4 |
| 6,238,338 B1 | * | 5/2001 | DeLuca et al. ............ 600/300 |
| 6,262,660 B1 | * | 7/2001 | Segale et al. .......... 340/539.15 |
| 6,286,102 B1 | | 9/2001 | Cromer et al. |
| 6,594,370 B1 | * | 7/2003 | Anderson .................. 381/315 |
| 6,711,474 B1 | * | 3/2004 | Treyz et al. ................... 701/1 |
| 6,714,133 B2 | * | 3/2004 | Hum et al. ............. 340/573.4 |
| 2003/0122655 A1 | * | 7/2003 | Hum et al. ................ 340/10.3 |

FOREIGN PATENT DOCUMENTS

GB  2 316 266 A  2/1998

\* cited by examiner

*Primary Examiner*—Duc M. Nguyen
*Assistant Examiner*—Michael Vu

(57) ABSTRACT

A home or office is remotely monitored by an authorized caller using wireless piconet networks between personal wireless piconet identifier devices worn or carried by particular persons and a remotely accessible access monitor base unit. Persons are monitored by an authorized remote person using a personal wireless piconet identifying device. Each personal wireless piconet identifying device includes a unique code serving as a personal identifier. An access monitoring base unit (e.g., a cordless telephone) includes a piconet network front end which establishes a piconet or scatternet network connection with a wireless piconet entrance/exit monitor, which in turn establishes temporary wireless piconet networks with the personal wireless piconet identifying units. A properly authorized caller may remotely access the access monitor base unit, enter a suitably secure access code, and request and download desired information from the piconet participant database, either in digital or audible form.

8 Claims, 6 Drawing Sheets

ACCESS MONITORING/CORDLESS BASE PICONET CONNECTION

ACCESS MONITORING VIA PICONET CONNECTION TO TELEPHONE

This application is a Continuation application of U.S. application Ser. No. 09/553,283, entitled "ACCESS MONITORING VIA PICONET CONNECTION TO TELEPHONE", filed on Apr. 20, 2000, now abandoned to CANNON et al.

BACKGROUND OF THE INVENTION

1. Field of the Invention

This invention relates generally to access monitoring. More particularly, it relates to the use of a telephone device such as a cordless telephone as a monitor of whomever is home.

2. Background of Related Art

Whenever a person makes a call to a household that they are very familiar with such as their own, they typically want to talk to a particular household member. However, using conventional telephone equipment, a caller has no knowledge of who is at the called household (if anyone) unless someone answers the telephone call and informs them.

There are times when an authorized caller might want to know who is home, and/or when they arrived home or left home. For instance, a parent might want to determine if and when a child has arrived home from school.

In a business scenario, a supervisor might want to know if a particular worker has arrived at their office. Moreover, the supervisor might want to know if and/or when that particular worker has left the office.

In a commercial scenario, a parole officer might want to check on the whereabouts of a particular criminal without having to actually visit each household of the persons under their watch.

It is often frustrating to some callers to call in to their own household or business from a remote telephone only to have a telephone answering device or other voice messaging system answer the telephone call, leaving as a mystery whether or not anyone is at the household or business and is simply screening their calls, or even not knowing who is at the household or business. To such frustrated callers, it is often desirable for them to know which members of their particular household or business are resident at any particular time.

Using current technology, a caller must either presume the presence or absence of a particular person by calling them or their household, and based on whether or not the call is answered presume the presence or absence of the desired person or persons.

There is a need for an accurate and remotely accessible monitoring system which allows a properly authorized caller to determine if a particular person is in the called home or business, and/or when that particular person (or persons) arrived and/or left the premises.

SUMMARY OF THE INVENTION

In accordance with the principles of the present invention, an access monitoring base unit comprises a wireless piconet front end, and a database to contain at least one entry relating to a presence of a monitored person within a monitored area.

A personal wireless piconet identifying device comprises a wireless piconet front end, and a unique wearer ID code relating to an identity of a person associated with the personal wireless piconet identifying device.

In accordance with another aspect of the present invention, an access monitoring system comprises a base unit, comprising a wireless piconet front end, and a database to contain at least one entry relating to a presence of a monitored person within a monitored area. The access monitoring system also comprises at least one personal wireless piconet identifying device, comprising a wireless piconet front end, and a unique wearer ID code relating to an identity of a person associated with the personal wireless piconet identifying device.

A method of monitoring a presence of at least one person within a monitored area in accordance with yet another aspect of the present invention comprises establishing a wireless network between a personal wireless piconet identifying device associated with a particular monitored person and an access monitoring base unit. A presence or absence of the particular monitored person within the monitored area is noted based on the established wireless network.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a wireless piconet transmitter/receiver which is held or worn by relevant members of a household (e.g., on their person, in a purse, on a jacket, etc.) The wireless piconet transmitter/receiver may be, e.g., a wireless piconet equipped watch or other jewelry.

The personal wireless piconet transmitter/receiver includes a unique code serving as a personal identifier.

A popular wireless piconet standard is known as BLUETOOTH. Further information about the BLUETOOTH standard is available, e.g., at www.bluetooth.com. Wireless piconet requirements such as BLUETOOTH enable various devices to communicate with one another in an effort to facilitate the exchange of information.

Figure 1:
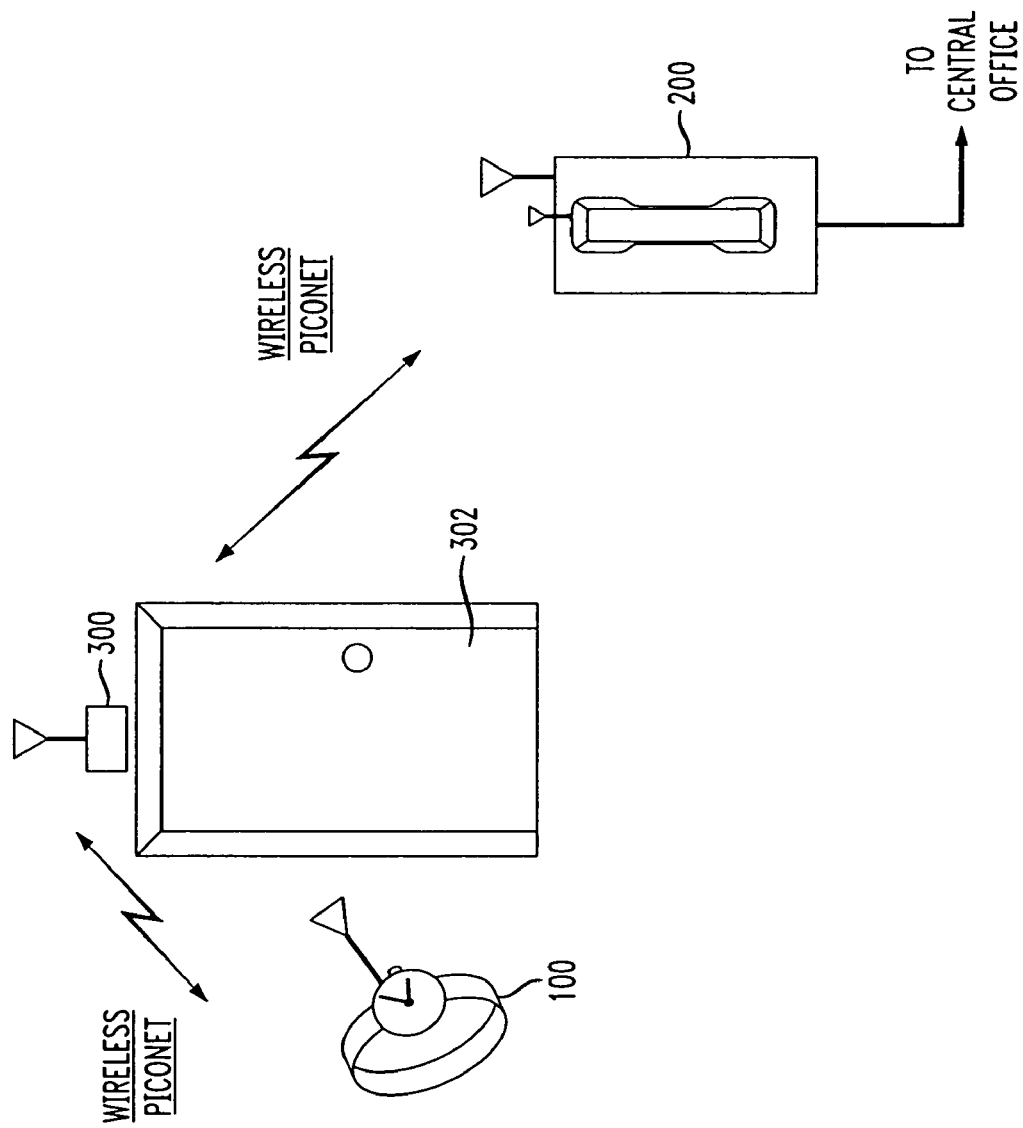
FIG. 1 shows an exemplary implementation of a wireless access monitoring system allowing remote access to a database of relevant persons currently in the household or business, in accordance with the principles of the present invention.

FIG. 1 shows an exemplary implementation of a wireless access monitoring system allowing remote access to a database of relevant persons currently in the household or business, in accordance with the principles of the present invention.

In particular, FIG. 1 shows the use of a wireless piconet entrance/exit monitor 300 to establish temporary piconet network connections with unique personal wireless piconet identifier devices 100 such as a watch when within range. A typical range for the piconet network such as a BLUETOOTH protocol piconet network is 10 to 15 meters.

The personal wireless piconet identifier device 100 includes an identifier code which is unique to the relevant wireless piconet network. The identifier code is communicated to the wireless piconet entrance/exit monitor 300 to provide an identification of the particular person who passes through the entrance/exit 302.

The wireless piconet entrance/exit monitor 300 may include two wireless piconet devices, one directed toward communications inward (using, e.g., a directional antenna) toward the household or business and the other directed toward communications outward from the household or business. Thus, depending on which of the two wireless piconet devices are last in communication with the personal wireless piconet identifier device 100 can be used to determine whether the relevant person has entered or exited the household or business.

Another technique to determine the presence of a particular person or persons using a single wireless piconet device is to use polling. Using the polling technique, a master device periodically polls all members of the piconet network to determine if they are within range of the piconet network. Any device which is within range and responds to the poll will be considered to be at home. Any device not responding to a broadcast or addressed poll request will be considered to be not home.

As shown in FIG. 1, a larger range piconet network is established with a device having access to a telephone network, e.g., a cordless telephone 200. Of course, other devices such as a telephone answering device, corded telephone, cellular telephone, etc., may serve as the base of the access monitoring system.

The cordless telephone 200 includes a piconet network front end which establishes a piconet connection (e.g., a larger range scatternet up to about, e.g., 100 meters) with the wireless piconet entrance/exit monitor 300. Based on information communicated between the wireless piconet entrance/exit monitor 300 and the base unit of the cordless telephone 200, a database can be maintained relating to who is currently within the household or business, and when they arrived. Historical information may also be maintained in the database, such as the time frames that particular persons were within the household or business.

The wireless piconet entrance/exit monitor 300 can be incorporated into another device such as a door lock, or a door. Moreover, the wireless piconet entrance/exit monitor 300 can be mounted inside or outside the monitored area.

Using a remote access module in the cordless telephone 200 and a special access code, an authorized caller may call in to the cordless telephone (or telephone answering device), enter the special access code, and download any or all contents of the monitoring database.

The contents of the monitoring database may be downloaded in digital and/or audible form. For instance, a DTMF technique may be used to encode requested data from the monitoring database if a suitable corresponding DTMF decoder is used by the caller at the calling end. Alternatively, a voice synthesizer may be used to output audibly the requested information maintained in the monitoring database. A default condition can be established, e.g., allowing a telephone answering device to automatically answer incoming calls either after a first ring or after a predetermined number of rings if nobody is within the premises as determined by the access monitoring system in accordance with the principles of the present invention.

The principles of the present invention may be expanded into additional features. For instance, the likelihood of a dead battery in a personal wireless piconet identifier device 100 may be determined, e.g., based on a receive signal strength indicator (RSSI) of a last received signal, and/or based on a declining pattern of a series of recent received signals. Thus, if a personal wireless piconet identifier device 100 fails to respond to a poll, likely causes of the absence may be explored, e.g., the likelihood or probability of a battery failure in the personal wireless piconet identifier device 100.

Moreover, the likelihood of the personal wireless piconet identifier device 100 being removed from the relevant person and left stationary, e.g., on a table, may be determined. For instance, triangulation and/or RSSI may be utilized to determine whether or not the personal wireless piconet identifier device 100 is moving about the household. Alternatively, an appropriate sensing device (e.g., an accelerometer) may be integrated into the personal wireless piconet identifier device 100 to detect movement. Measurement information from the sensing device may then be transmitted to the wireless piconet entrance/exit monitor 300.

Utilizing measured movement information, an appropriate application program in communication with the wireless piconet entrance/exit monitor 300 may determine the likelihood or probability that the wearer has removed the wireless piconet entrance/exit monitor 300.

The movement or motion information may be trained or compared against other information (e.g., time of day) to further refine the determination of the likelihood or probability that the person has removed the personal wireless piconet identifier device 100. For instance, it may be less likely that the person has removed the personal wireless piconet identifier device 100 during bedtime hours, when motion is less likely.

Figure 2:
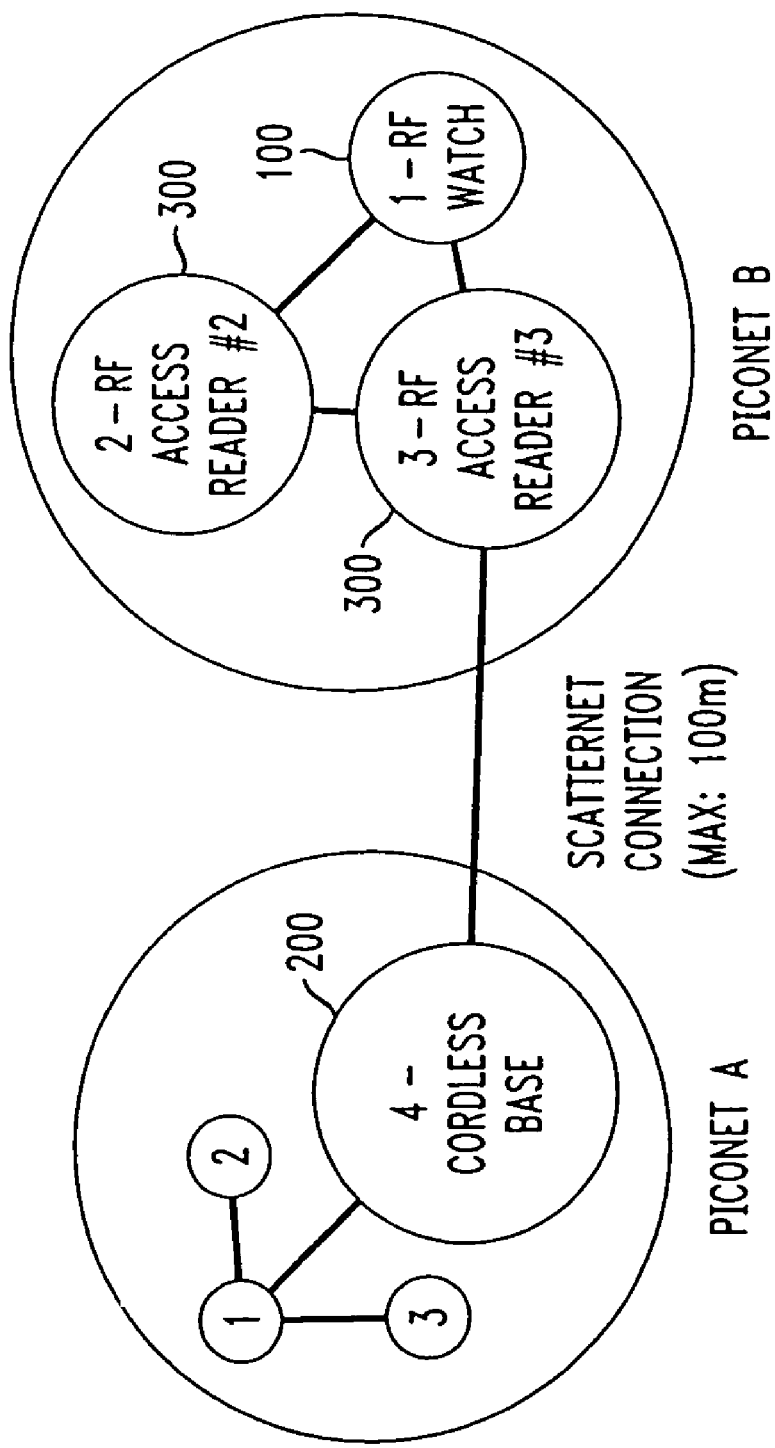
FIG. 2 shows a general diagram of an access monitoring/cordless telephone base unit wireless piconet network, in accordance with the principles of the present invention.

FIG. 2 shows a general diagram of an access monitoring/cordless telephone base unit wireless piconet network, in accordance with the principles of the present invention.

In particular, as shown in FIG. 2, a first wireless piconet (Piconet A) is formed by the cordless telephone 200 and any other devices within the home or business desiring to communicate with one another. A second wireless piconet (Piconet B) is formed between one or more wireless piconet entrance/exit monitors 300 and one or more personal wireless piconet identifier devices 100. The hardware and software necessary for the establishment of wireless piconets is well known in the art.

Piconet A communicates with Piconet B using a longer range wireless communication protocol, e.g., a scatternet connection using BLUETOOTH standards as shown in FIG. 2. Of course, any other suitable wireless standard may be used to provide a fixed or temporary communication channel between the base unit of the cordless telephone 200 and one or more wireless piconet entrance/exit monitors 300. Alternatively, the cordless telephone 200 may be hardwired to the wireless piconet entrance/exit monitor 300.

Figure 3:
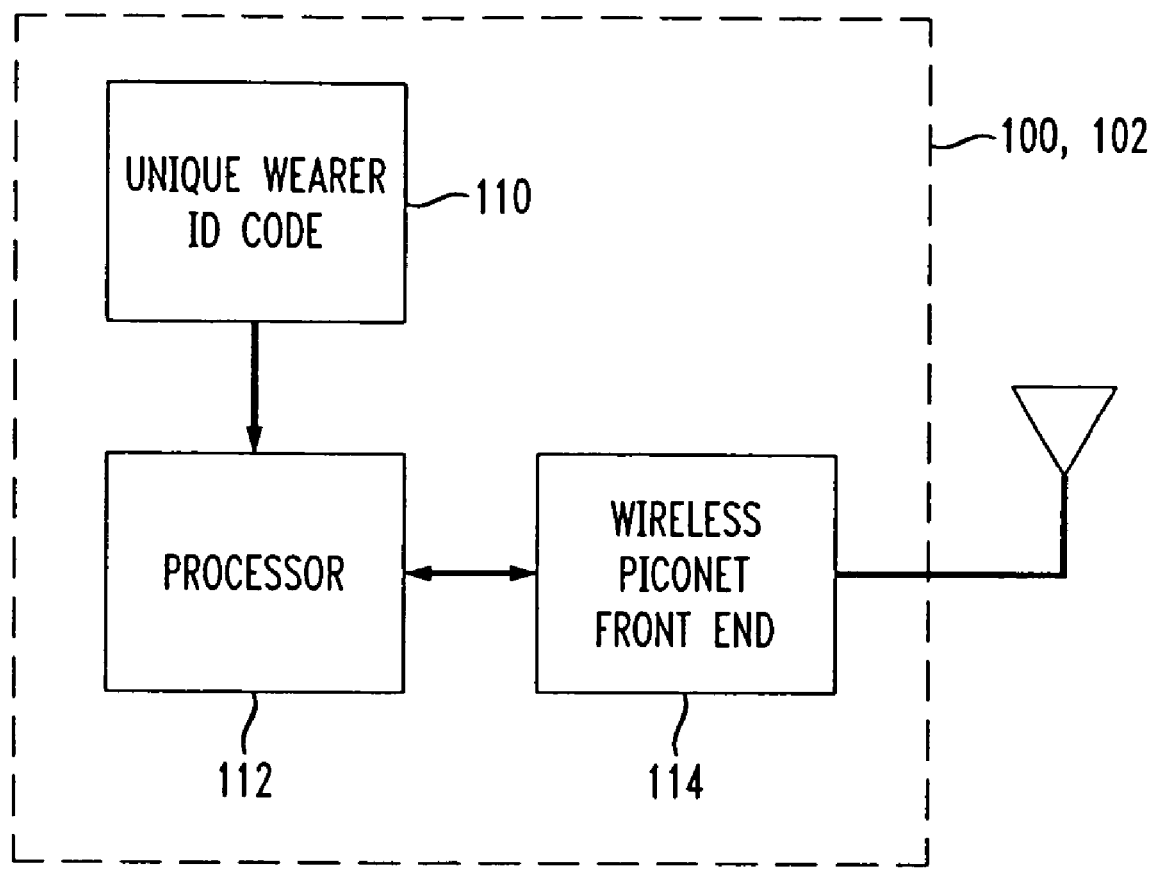
FIG. 3 is a block diagram of the relevant portions of an exemplary personal wireless piconet identifier device shown in FIG. 1.

FIG. 3 is a block diagram of the relevant portion of an exemplary personal wireless piconet identifier device 100, 102 shown in FIG. 1.

In particular, as shown in FIG. 3, a personal wireless piconet identifier device 100, 102 includes a unique wearer identifier code 110, a wireless piconet front end 114, and a suitable processor 112 to control the wireless piconet front end 114 and to store the unique wearer identifier code 110.

The processor 112 may be any suitable processor device, e.g., a microprocessor, a microcontroller, a digital signal processor (DSP), and/or an ASIC.

Any suitable wireless piconet front end 114 known in the art may be used in the unique wireless piconet identifier device 100, 102.

The unique wearer identifier code 110 may be any suitable data, e.g., a four (4) digit alphanumeric data string. Of course, fewer or greater numbers of digits are within the scope of the present invention, as is the use of only numbers, or only letters. For example, if a BLUETOOTH solution is employed, a suitable unique wearer identifier code 110 can be directly or indirectly based on the BLUETOOTH device address of the personal wireless piconet identifier device 100, 102.

The unique wearer identifier code 110 may be fixed by a manufacturer, or may be set or otherwise input by the user. For instance, a set of dip switches may be used to set the particular unique wearer identifier code 110. Alternatively, a wearer or user of the access monitoring system may input the unique wearer identifier code 110 through the processor 112 using a keypad or other user input device.

Depending upon the particular application, the unique wearer identifier code 110 can be set by the manufacturer (e.g., using a BLUETOOTH device address), or can be set by the user.

The personal wireless piconet identifier device 100, 102 may be implemented in association with jewelry such as a bracelet, necklace, or watch, a key chain, a purse, a wallet, etc. The main purpose of the personal wireless piconet identifier device 100, 102 is to identify to a home wireless network that a particular person is present (or absent).

Figure 4:
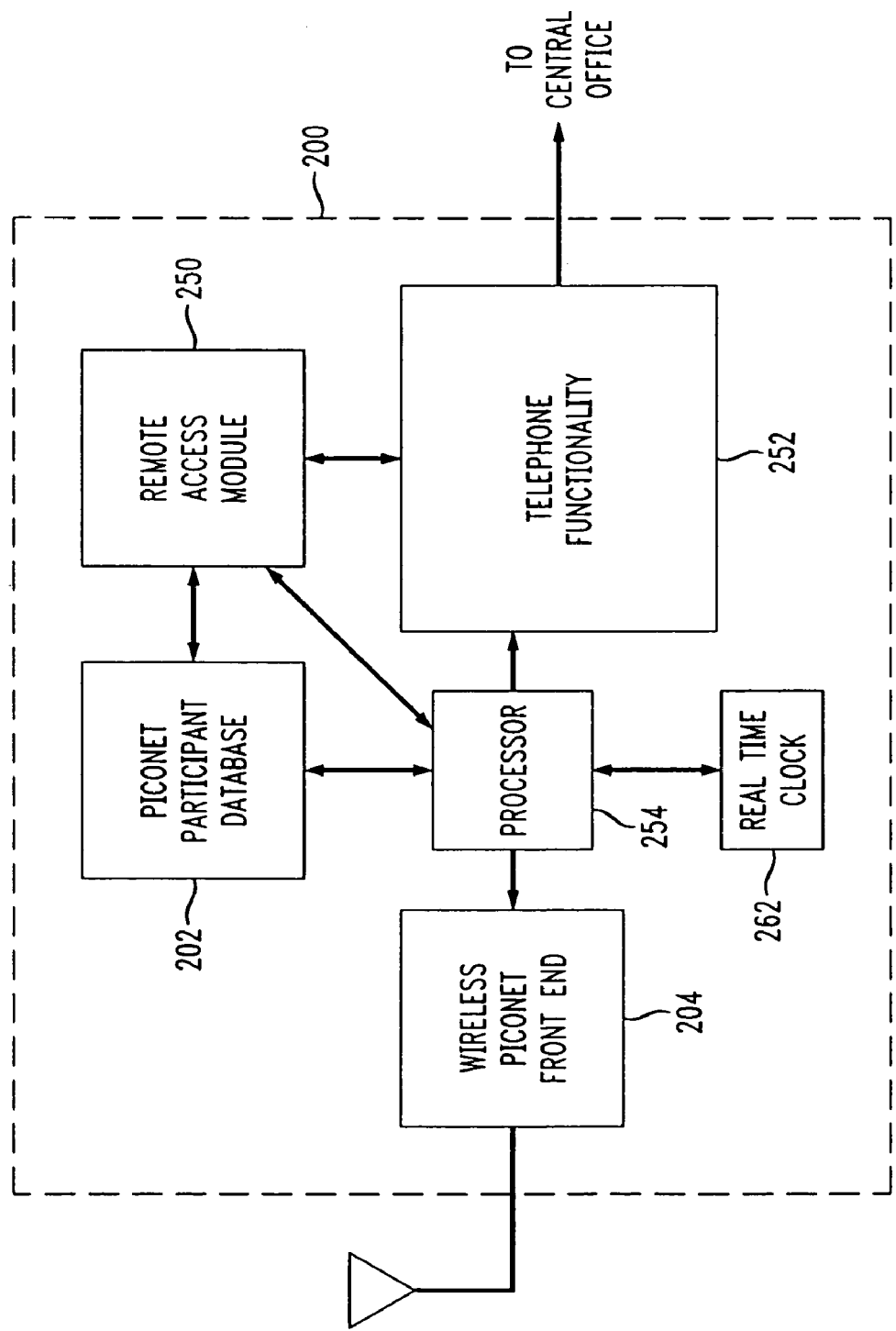
FIG. 4 is a block diagram of the relevant portions of an exemplary access monitor base unit, e.g., a base unit of a cordless telephone or a telephone answering device, in accordance with the principles of the present invention.

FIG. 4 is a block diagram of the relevant portions of an exemplary access monitor base unit 200, e.g., a base unit of a cordless telephone, a telephone answering device, or a personal computer, in accordance with the principles of the present invention.

In particular, as shown in FIG. 4, the access monitor base unit 200 includes a wireless piconet front end 204, and a telephone module 252 including a remote access module 250. Any suitable processor 254 may be used, including a processor resident in the telephone module 252, in the remote access module 250, and/or in the wireless piconet front end 204. The processor 254 may be any suitable processor, e.g., a microprocessor, a microcontroller, or a digital signal processor.

Importantly, the access monitoring base unit 200 includes a piconet participant database 202. The piconet participant database 202 comprises any suitable formatted listing of entries, e.g., from a simple list to an Excel(™), Access(™), or other commercially available standardized formatted database entry.

Each entry in the piconet participant database 202 may relate to a relevant individual as identified either based solely on the unique wearer ID codes 110 communicated from relevant personal wireless piconet identifier units 100, and/or based on an actual name of the person wearing the relevant personal wireless piconet identifier unit 100. The access monitoring base unit 200 may include mapping information to map actual names to the unique wearer ID codes 110 if necessary.

Preferably, each entry in the piconet participant database 202 may also be corresponded with time stamp information obtained from a real time clock 262 relating to when that particular person entered or exited the monitored area.

Figure 5:
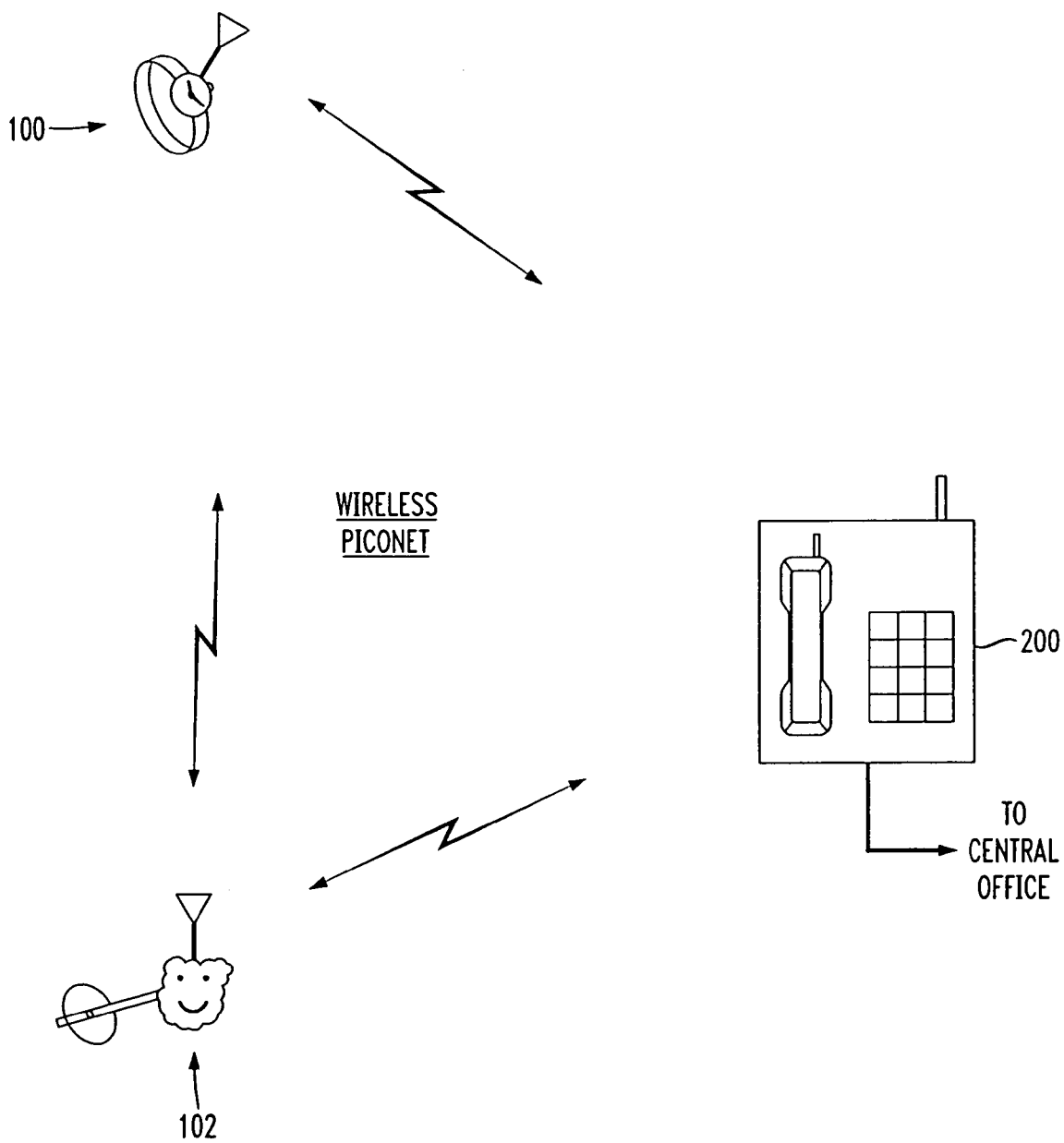
FIG. 5 shows an alternative embodiment of the present invention wherein personal wireless piconet identifier devices establish wireless piconet network communications directly with the access monitoring base unit (e.g., a cordless telephone as shown or a telephone answering device), in accordance with the principles of the present invention.

FIG. 5 shows an alternative embodiment of the present invention wherein personal wireless piconet identifier devices 100, 102 establish wireless piconet network communications directly with the access monitoring base unit (e.g., a cordless telephone 200 as shown or a telephone answering device), in accordance with the principles of the present invention.

In particular, as shown in FIG. 5, a temporary wireless network is formed by the personal wireless piconet identifier devices 100, 102 directly with the access monitoring base unit 200 as they enter and/or exit a particular household or business. The temporary wireless network as shown is preferably a piconet using the BLUETOOTH standards, but may be a scatternet to provide longer range access monitoring, or other wireless network standard.

The embodiment shown in FIG. 5 is particularly useful in smaller surroundings, e.g., within a cubicle of an office, within one or two rooms in a house, etc.

A useful extension of the access monitoring system in accordance with the principles of the present invention allows the access monitoring base unit to call or e-mail a particular person (e.g., a supervisor, a parent, etc.) once the monitored person arrives at or exits the home or office.

For instance, a properly authorized user may input a telephone number to call when a particular unique wearer ID code 110 is detected as arriving at or leaving a home or office. When called, the access monitoring base unit may play a pre-recorded or synthesized message indicating who and/or when the monitored person arrives or leaves the monitored premises. The telephone number and/or particular unique wearer ID code(s) 110 may be input by the properly authorized user after entry of a suitable security access code into the access monitoring base unit 200, either locally or through use of the remote access module 250.

Short trips out of range of the wireless access monitoring system may be filtered out to provide more accurate information. For instance, it may not be desired to have a short trip outside of the home to put the garbage by the street curbside or other short trip outside the range of the wireless access monitoring system reported as the relevant person leaving the home. Thus, a type of hysteresis may be provided to delay reporting of a person not within range of the wireless access monitoring system until after that person has been outside the range of the wireless access monitoring system for a particular length of time, e.g., for 15 minutes. The user preferably can configure the particular length of time depending upon the circumstances and/or upon the application. Confirmed absences using hysteresis in accordance with this embodiment may be reported to the relevant monitoring person using, e.g., an email message.

Figure 6:
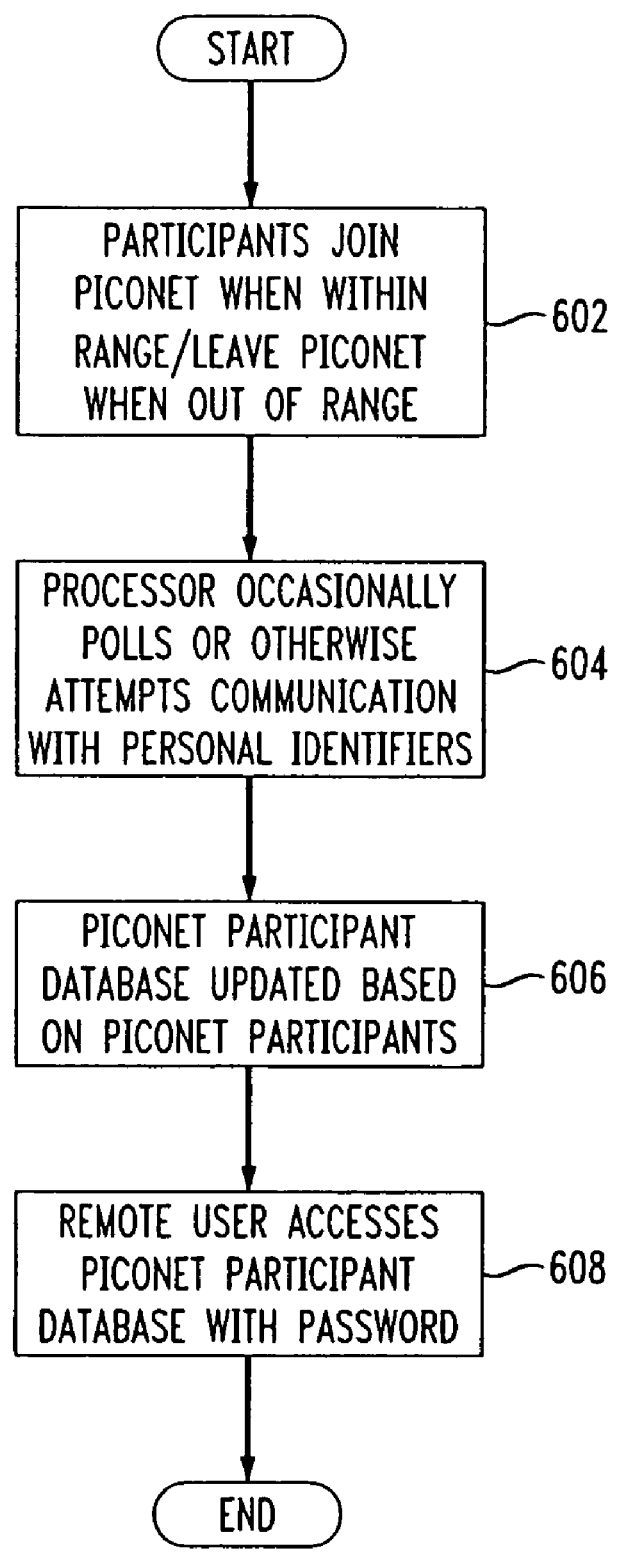
FIG. 6 shows an exemplary process flow diagram of access monitoring using a polling technique, in accordance with the principles of the present invention.

FIG. 6 shows an exemplary process flow diagram of access monitoring using a polling technique, in accordance with the principles of the present invention.

In particular, as shown in step 602 of FIG. 6, participants (i.e., personal wireless piconet identification devices 100) join a piconet when within range of either the entrance/exit monitors 300 as shown in FIG. 1, or directly with the access monitor base unit 200 as shown in FIG. 5.

The participants preferably establish temporary wireless piconet connections with the entrance/exit monitor 300 or access monitor base unit 200 to conserve battery power in the personal wireless piconet identifier units 100. The temporary wireless piconet connections may be occasionally established (e.g., periodically such as every 1 minute, every 5 minutes, every half hour, etc.). The establishment of the temporary wireless piconet connections are preferably initiated by the personal wireless piconet identifier units 100 to avoid the need for including expected personal identifier units 100 within a polling mechanism of the access monitor base unit 200. However, as shown in step 604 of FIG. 6, a polling mechanism may be used by the access monitor base unit 200 to wake up and temporarily establish a wireless piconet network with any or all personal wireless piconet identifier units 100 at desired intervals.

In step 606, the piconet participant database 202 is updated to reflect any appearances or disappearances of personal wireless piconet identifier units 100 within the monitored area.

In step 608, a properly authorized caller may remotely access the access monitor base unit 200, enter a suitably secure access code, and request and download desired information from the piconet participant database 202.

The personal wireless piconet identifying devices 100, 102 need not utilize a full wireless communications channel with the wireless piconet entrance/exit monitor 300 (FIG. 1) or directly with the access monitor base unit 200 (FIG. 5). Rather, the personal wireless piconet identifying devices 100, 102 need merely have their presence known to the wireless piconet network. In this way, the personal wireless piconet identifying devices 100, 102 can be greatly simplified to reduce size and expense, and to minimize power requirements.

Given the presence or absence of particular persons within a wireless home network such as a piconet network, many other applications are possible.

For instance, a cable TV access box could disable particular TV channels based on who is present in a monitored room.

As another example, a pet can be given a collar containing a personal wireless piconet identifying unit 100, and the pets presence near an exit may allow the pet to unlock an access door in the exit.

Using an access monitoring system in accordance with the principles of the present invention, a personal computer workstation can be provided with information relating to whether or not an authorized user is within the vicinity, enabling or disabling particular application programs, or even automatically starting the personal computer up when the authorized person is detected as being present in the home or office.

Accordingly, a small or large area such as a home or office may be remotely monitored by a properly authorized caller using wireless piconet networks between personal wireless piconet identifier devices worn or carried by particular persons and a remotely accessible access monitor base unit.

While the invention has been described with reference to the exemplary embodiments thereof, those skilled in the art will be able to make various modifications to the described embodiments of the invention without departing from the true spirit and scope of the invention.

The invention claimed is:

1. A telephone answering device, comprising:
   a digital answering machine;
   a wireless piconet front end; and
   a monitoring module to determine a presence of a monitored person within a monitored area, said monitoring module determining a presence of a user of said telephone answering device when a piconet device uniquely associated with said user is present in a piconet including said wireless piconet front end of said telephone answering device;
   wherein said telephone answering device automatically answers an incoming call when said monitoring module determines that said user is not present, and allows additional rings when said user is present.

2. The telephone answering device according to claim 1, further comprising:
   a wireless piconet entrance/exit monitor in communication with said telephone answering device determining a presence of said user based on a physical movement of a personal wireless piconet identifying device worn by said user.

3. A method of automatically answering a telephone call, comprising:
   searching for a presence of a user of a telephone answering device via a piconet communications device associated with said user's presence; automatically answering said telephone call if said user is not present; and
   allowing said telephone call to continue to ring if said user is present as determined by a presence of said piconet communications device associated with said user's presence.

4. The method of automatically answering a telephone call according to claim 3, further comprising:
   implementing said piconet communications device with jewelry worn by said user.

5. The method of automatically answering a telephone call according to claim 3, further comprising:
   implementing said piconet communications device with a wallet or purse of said user.

6. Apparatus for automatically answering a telephone call, comprising:
   means for searching for a presence of a user of a telephone answering device via a piconet communications device associated with said user's presence; means for automatically answering said telephone call if said user is not present; and
   means of allowing said telephone call to continue to ring if said user is present as determined by a presence of said piconet communications device associated with said user's presence.

7. The apparatus for automatically answering a telephone call according to claim 6, further comprising:
   means for implementing said piconet communications device with jewelry worn by said user.

8. The method of automatically answering a telephone call according to claim 6, further comprising:
   means for implementing said piconet communications device with a wallet or purse of said user.

* * * * *